US007611071B2

(12) United States Patent
Bolyard, Jr. et al.

(10) Patent No.: US 7,611,071 B2
(45) Date of Patent: Nov. 3, 2009

(54) INTERMITTENTLY OPERABLE RECIRCULATING CONTROL MODULE AND DISPENSING NOZZLE HAVING INTERNALLY DISPOSED FIXED ORIFICE

(75) Inventors: Edward W. Bolyard, Jr., Old Hickory, TN (US); Mairi MacLean, Hendersonville, TN (US)

(73) Assignee: Illinois Tool Works Inc., Glenview, IL (US)

( * ) Notice: Subject to any disclaimer, the term of this patent is extended or adjusted under 35 U.S.C. 154(b) by 423 days.

(21) Appl. No.: 11/408,994

(22) Filed: Apr. 24, 2006

(65) Prior Publication Data

US 2007/0246576 A1 Oct. 25, 2007

(51) Int. Cl.

| | |
|---|---|
| ***B05B 17/04*** | (2006.01) |
| *B05B 9/00* | (2006.01) |
| *B05B 1/24* | (2006.01) |
| *B05B 1/14* | (2006.01) |
| *B05C 1/00* | (2006.01) |
| *A01G 25/02* | (2006.01) |

(52) U.S. Cl. ......................... 239/13; 239/124; 239/128; 239/133; 239/134; 239/135; 239/137; 239/267; 239/268; 239/550; 239/551; 239/125

(58) Field of Classification Search ................. 239/125, 239/124, 128, 133–135, 137, 267, 268, 550, 239/551, 13

See application file for complete search history.

(56) References Cited

U.S. PATENT DOCUMENTS

| | | | | |
|---|---|---|---|---|
| 4,495,967 | A * | 1/1985 | Needham et al. | 137/614.06 |
| 4,627,465 | A * | 12/1986 | Kolibas et al. | 137/563 |
| 5,407,101 | A * | 4/1995 | Hubbard | 222/146.5 |
| 6,089,413 | A * | 7/2000 | Riney et al. | 222/318 |
| 6,171,089 | B1 | 1/2001 | Oehman, Jr. | |
| 6,419,126 | B2 * | 7/2002 | Righolt | 222/330 |
| 6,422,428 | B1 * | 7/2002 | Allen et al. | 222/318 |
| 6,607,104 | B2 * | 8/2003 | McGuffey | 222/318 |
| 6,688,498 | B1 * | 2/2004 | McGuffey | 222/333 |
| 6,935,576 | B2 * | 8/2005 | Hara | 239/104 |
| 2004/0099752 | A1 | 5/2004 | Boger | |

* cited by examiner

*Primary Examiner*—Dinh Q Nguyen
*Assistant Examiner*—Steven Cernoch
(74) *Attorney, Agent, or Firm*—Law Offices of Steven W. Weinrieb

(57) ABSTRACT

A hot melt adhesive material application system is disclosed wherein both the control module and the dispensing nozzle are effectively provided with internal alternative flow paths. A fixed orifice is internally incorporated within the dispensing nozzle such that when the hot melt adhesive material is not being supplied to the dispensing nozzle and its discharge orifice, the hot melt adhesive material can be recirculated through the dispensing nozzle and the control module in accordance with controlled backpressure parameters which correspond to the supply pressure which is characteristic of the hot melt adhesive material being supplied to the dispensing nozzle and its discharge orifice.

18 Claims, 2 Drawing Sheets

INTERMITTENTLY OPERABLE RECIRCULATING CONTROL MODULE AND DISPENSING NOZZLE HAVING INTERNALLY DISPOSED FIXED ORIFICE

FIELD OF THE INVENTION

The present invention relates generally to hot melt adhesive material dispensing systems, and more particularly to a new and improved hot melt adhesive material dispensing system wherein both the control module and the dispensing nozzle block are provided with internal alternative discharge and recirculation flow paths. A fixed orifice is incorporated in the recirculation flow path of the dispensing nozzle block such that when hot melt adhesive material is not being supplied to the dispensing nozzle block discharge orifice, the hot melt adhesive material can be recirculated through the dispensing nozzle block in accordance with controlled backpressure parameters which correspond to the supply pressure which is characteristic of the hot melt adhesive material that is alternatively supplied to the dispensing nozzle block and its discharge orifice.

BACKGROUND OF THE INVENTION

Hot melt adhesive metered dispensing systems must be operated intermittently in order to, for example, only deposit the hot melt adhesive material upon predetermined regions of substrates, at predetermined times, so as not to cause operational problems or to result in undesirable product characteristics, and concomitantly, to control the flow of the hot melt adhesive material during those periods of time when the hot melt adhesive material is not actually being dispensed. Control modules, having suitable valve mechanisms incorporated therein, are conventionally used to effectively control the starting and stopping of the flow of the hot melt adhesive material to the dispensing nozzle and its associated discharge orifice. In view of the fact that the metering pumps, for supplying the hot melt adhesive material to the control module, are typically operated in a continuous manner for achieving proper or desirable operational and control parameters, the hot melt adhesive material must therefore be effectively rerouted during those periods of time that the hot melt adhesive material is not actually being conducted to the dispensing nozzle block and its discharge orifice. This has been conventionally achieved by means of the control module which is effectively provided with two outlet ports whereby the hot melt adhesive material can alternatively be delivered to the dispensing nozzle block and its discharge orifice or to a recirculation passage or circuit.

In connection with the fluid flow of the hot melt adhesive material through the recirculation passage, it is necessary to control the backpressure within the recirculation passage such that the backpressure within the recirculation passage will be similar to, correspond with, or effectively match the fluid pressure characteristic of the hot melt adhesive material which is being conducted through the supply passage leading to the dispensing nozzle block and its discharge orifice. As a result of the control of the backpressure within the recirculation passage, when compared to the fluid pressure characteristic of the hot melt adhesive material which is being conducted through the supply passage leading to the dispensing nozzle block and its discharge orifice, it is therefore possible to effectively minimize pressure spikes within the system and therefore eliminate significant variations in the amount of hot melt adhesive material which is actually dispensed from the discharge orifice of the dispensing nozzle block. In other words, problems in connection with the discharge of too much or too little hot melt adhesive material from the discharge orifice of the dispensing nozzle block are effectively prevented or eliminated. The actual control of the backpressure within the recirculation passage is conventionally achieved by means of a suitable simple fixed orifice which is located at a predetermined location within the recirculation passage, that is, somewhere along the recirculation flow path.

Conventionally, the fixed orifice has been placed within the recirculation passage, or along the recirculation flow path, at a position which is located between the applicator and the control module, and external of the dispensing nozzle block. In view of the fact, however, that the fixed orifice must effectively be matched with the size or configuration of the dispensing nozzle block and its discharge orifice, in order to achieve essentially the same fluid pressure within both the recirculation passage and the supply passage leading to the dispensing nozzle block and its discharge orifice, the provision of the fixed orifice at its conventional location, that is, between the applicator and the control module, and external of the dispensing nozzle block, becomes problematic when the particular dispensing nozzle block and its discharge orifice are changed or replaced with a dispensing nozzle block and a discharge orifice having, for example, a different design, in order to, for example, achieve a different hot melt adhesive deposition or distribution pattern, because operational personnel must then likewise replace the fixed orifice. Not only does this process require the operational personnel to implement additional setup procedures, but there is the potential or possibility of operational personnel mismatching the fixed orifice with the dispensing nozzle block and its discharge orifice.

Accordingly, there is a need in the art for a new and improved hot melt adhesive material dispensing system wherein the recirculation of the hot melt adhesive material, during those time periods of time that the hot melt adhesive material is not actually being conducted to the dispensing nozzle block and its discharge orifice, would be implemented without encountering the aforenoted operational problems characteristic of conventional hot melt adhesive dispensing systems.

SUMMARY OF THE INVENTION

The foregoing and other objectives are achieved in accordance with the teachings and principles of the present invention through the provision of a new and improved hot melt adhesive dispensing system which comprises an applicator which supplies metered hot melt adhesive material, a control module in which alternative, divergent hot melt adhesive material supply and recirculating flow paths are defined, and a dispensing nozzle block within which alternative, divergent hot melt adhesive material supply and recirculating flow paths are likewise defined. The dispensing nozzle block is provided with a discharge orifice wherein the hot melt adhesive material supply flow path, defined within the dispensing nozzle block, effectively fluidically interconnects the hot melt adhesive material supply flow path of the control module to the dispensing nozzle block discharge orifice, while, in addition, the dispensing nozzle block is also provided with a fixed orifice, which is located within the recirculating flow path defined within the dispensing nozzle block, wherein the recirculating flow path, defined within the dispensing nozzle block and having the fixed orifice incorporated therein, fluidically conducts the recirculated hot melt adhesive material, received from the control module, back to the control module.

As a result of the integral incorporation of the fixed orifice internally within the dispensing nozzle block, the backpressure requirements of the hot melt adhesive material dispensing system are readily satisfied, and yet the operational drawbacks, comprising the need to separately install a fixed orifice so as to match the particular design and discharge characteristics of the discharge orifice of the dispensing nozzle, or the potential for installing a fixed orifice which is mismatched with respect to the discharge orifice of the dispensing nozzle block, as is characteristic of the conventional hot melt adhesive dispensing systems, are obviated and eliminated. In other words, a separate installation process in connection with the fixed orifice is no longer necessary, and in addition, the fixed orifice is always properly matched to the discharge orifice of the dispensing nozzle block, all as a result of its integral incorporation within the dispensing nozzle block.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 2:
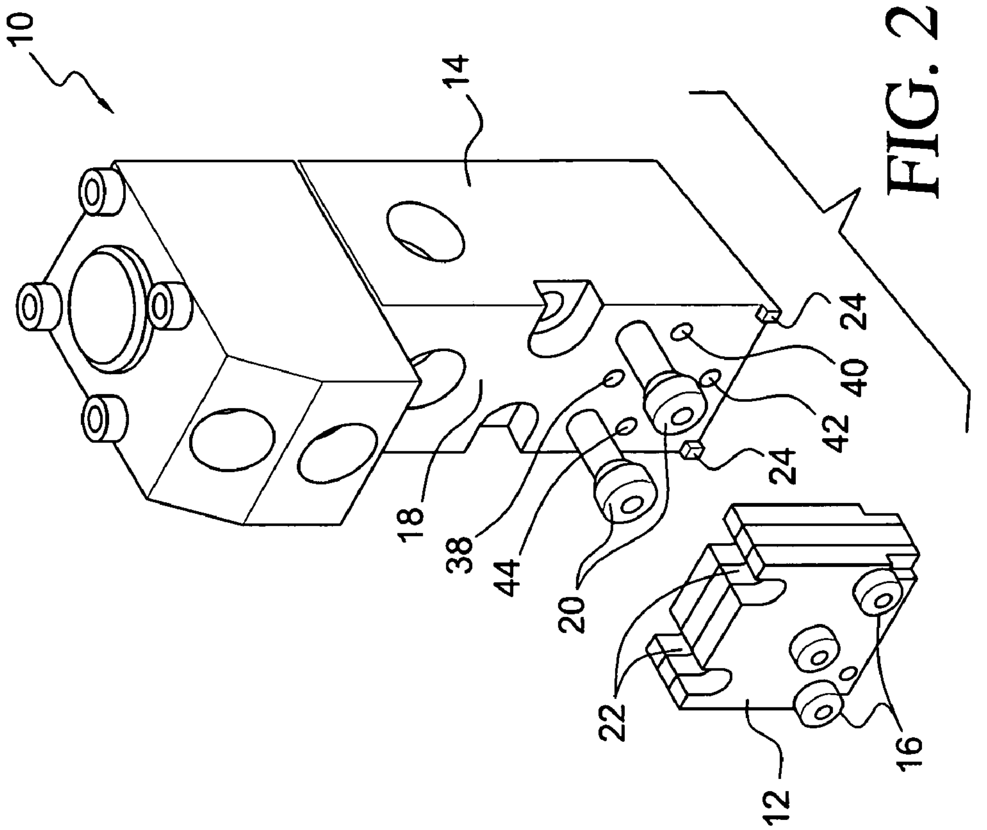
FIG. 2 is a front perspective exploded view of the control module and dispensing nozzle block components of the new and improved hot melt adhesive material dispensing system as constructed in accordance with the principles and teachings of the present invention and as disclosed within FIG. 1.
Figure 1:
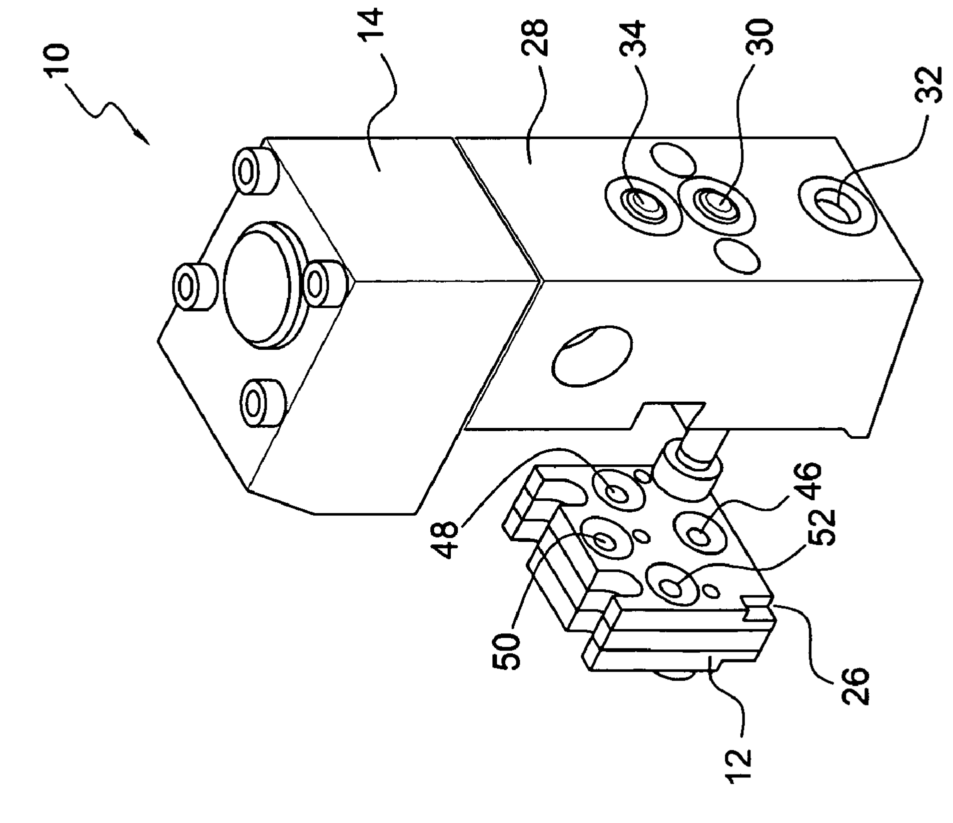
FIG. 1 is a rear perspective exploded view of the control module and dispensing nozzle block components of the new and improved hot melt adhesive material dispensing system constructed in accordance with the principles and teachings of the present invention.

Referring now to the drawings, and more particularly to FIGS. 1 and 2 thereof, a new and improved hot melt adhesive material dispensing system, constructed in accordance with the principles and teachings of the present invention, is disclosed and is generally indicated by the reference character 10. More particularly, it is seen that the new and improved hot melt adhesive material dispensing system 10 is seen to comprise a dispensing nozzle block 12 and a control module 14. The dispensing nozzle block 12 is seen to comprise, in effect, a sandwiched construction comprising several plate type components which are fixedly secured together by means of a plurality of bolt fasteners 16, and it is seen that the dispensing nozzle block 12 is adapted to be fixedly mounted upon the front face 18 of the control module 14 by means of a pair of suitable bolt fasteners 20. More specifically, as can best be appreciated from FIG. 2, it is seen that the upper edge portion of the dispensing nozzle block 12 is provided with a pair of recesses 22 for accommodating the shank portions of the bolt fasteners 20 while the head portions of the bolt fasteners 20 are adapted to engage the upper front face portion of the dispensing nozzle block 12 when the bolt fasteners 20 are fully threadedly engaged within their threaded bores defined within the control module 14. In this manner, when the dispensing nozzle 12 is to be removed from the control module 14, the bolt fasteners 20 need only be threadedly loosened within the threaded bores of the control module 14 but need not be removed from the control module 14. It is further seen that the lower front corner regions of the control module 14 are also provided with a pair of forwardly projecting lugs or bosses 24 which are adapted to be mated with and seated within a pair of corresponding recesses 26 which are provided upon the lower rear corner regions of the dispensing nozzle block 12 as can best be seen in FIG. 1, although it is noted that only one of the recesses 26 is visible within FIG. 1, and in this manner, the dispensing nozzle block 12 is effectively disposed in a stabilized seated position upon the front face 18 of the control module 14 when the bolt fasteners 20 are then utilized to fixedly secure the dispensing nozzle block 12 upon the control module 14.

With particular reference being additionally made to FIG. 1, it can be further seen that the rear face 28 of the control module 14 is provided with three ports or fluid connections 30,32,34. More specifically, the first port or fluid connection 30 comprises, in effect, an inlet port for the admission or supply of hot melt adhesive material which is to be supplied thereto from an applicator 36, as illustrated within FIG. 3, wherein the hot melt adhesive material, supplied from the applicator 36 to the control module 14, is supplied as a precisely metered supply by means of suitable metering pumps, not shown, which are disposed internally within the applicator 36. The second port or fluid connection 32 comprises, in effect, an inlet port for the admission or supply of process air for those instances in which process air is required or desired. As is known in the art, if the hot melt adhesive material is being dispensed, such as, for example, as relatively simple beads, process air is normally not utilized, however, if the hot melt adhesive material is being dispensed in accordance with a predetermined distribution pattern, then process air will ordinarily be required in order to in fact achieve the desired hot melt adhesive material distribution pattern. Lastly, the third port or fluid connection 34 comprises, in effect, a hot melt adhesive material recirculation outlet port for recirculating the hot melt adhesive material back toward the applicator 36, as will become more apparent hereinafter.

Reverting back to FIG. 2, it is likewise seen that the front face 18 of the control module 14 is provided with four additional ports or fluid connections 38,40,42,44. More particularly, the fourth port or fluid connection 38 of the control module 14 comprises, in effect, a hot melt adhesive material recirculation outlet port for conveying or conducting hot melt adhesive material into the dispensing nozzle block 12 and toward a recirculation flow path which is internally incorporated within the dispensing nozzle block 12, as will become more fully appreciated hereinafter, when the hot melt adhesive material is not to be supplied to the discharge orifice of the dispensing nozzle block 12. In a similar or corresponding manner, the fifth port or fluid connection 40 of the control module 14 comprises, in effect, a hot melt adhesive material recirculation inlet port for receiving the recirculated hot melt adhesive material from the recirculation flow path internally incorporated within the dispensing nozzle block 12, and it is to be noted that the fifth port or fluid connection 40 of the control module 14 is also adapted to be fluidically connected to the third port or fluid connection 34 of the control module 14 such that the recirculated hot melt adhesive material can in fact be conducted or conveyed back toward the applicator 36. The sixth port or fluid connection 42 of the control module 14 comprises, in effect, a hot melt adhesive material outlet port for conveying or conducting hot melt adhesive material into the dispensing nozzle block 12 and toward the discharge orifice of the dispensing nozzle block 12, while lastly, the seventh port or fluid connection 44 of the control module 14 comprises, in effect, an outlet port for supplying the process air into the dispensing nozzle block 12 and toward the discharge orifice of the dispensing nozzle block 12. It is noted that the seventh process air outlet port 44 is also adapted to be fluidically connected to the second port or fluid connection 32 of the control module 14 so as to receive the process air therefrom.

Continuing further, and reverting back to FIG. 1, it is additionally seen that the rear face of the dispensing nozzle block 12, corresponding to the front face 18 of the control module 14, is likewise provided with four ports or fluid connections 46,48,50,52. More particularly, the first port or fluid connection 46 comprises, in effect, an inlet port for receiving hot melt adhesive material from the control module 14 and, in particular, is adapted to be fluidically connected to the sixth hot melt adhesive material outlet port or fluid connection 42 of the control module 14 so as to conduct or convey the hot melt adhesive material toward the discharge orifice of the dispensing nozzle block 12. The second port or fluid connection 48 comprises, in effect, an inlet port for receiving the process air from the control module 14 and, in particular, is adapted to be fluidically connected to the seventh process air outlet port or fluid connection 44 of the control module 14 so as to likewise conduct or convey the process air toward the discharge orifice of the dispensing nozzle block 12. Still further, the third port or fluid connection 50 comprises, in effect, an inlet port for receiving the hot melt adhesive material, to be recirculated, from the control module 14, and in particular, is adapted to be fluidically connected to the fourth hot melt adhesive material recirculation outlet port or fluid connection 38 of the control module 14 so as to conduct or convey the recirculated hot melt adhesive material into the dispensing nozzle block 12 for conveyance along the recirculation flow path internally incorporated within the dispensing nozzle block 12. Lastly, the fourth port or fluid connection 52 comprises, in effect, an outlet port for outputting the recirculated hot melt adhesive material, which has been conducted along the recirculation flow path internally incorporated within the dispensing nozzle block 12, back toward the control module 14, it being appreciated that the fourth port or fluid connection 52 of the dispensing nozzle block 12 is adapted to be fluidically connected to the fifth hot melt adhesive material recirculation inlet port 40 of the control module 14.

Figure 3:
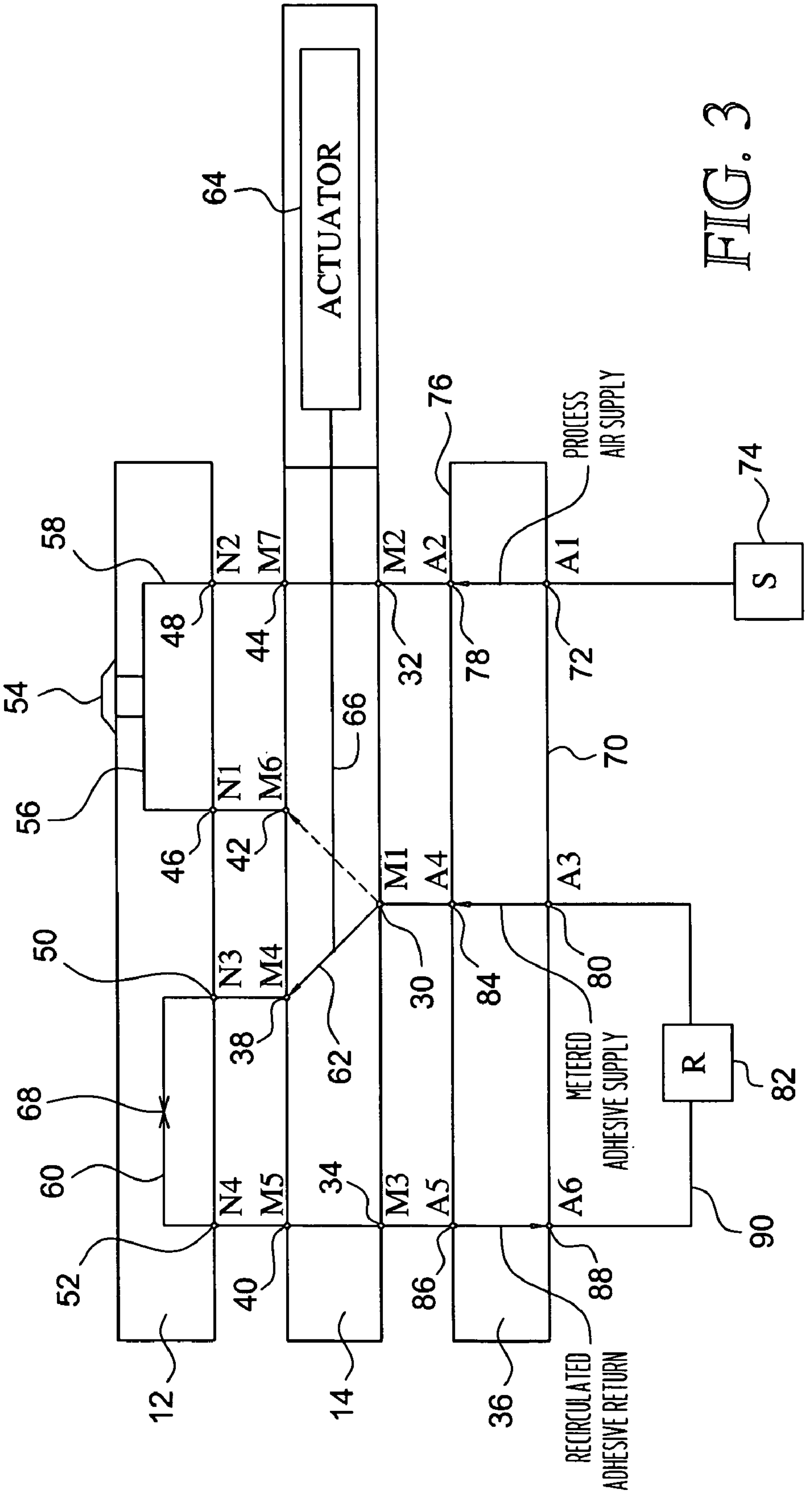
FIG. 3 is a schematic fluid flow diagram illustrating the fluid flow of the hot melt adhesive material within the applicator, control module, and dispensing nozzle block components of the new and improved hot melt adhesive material dispensing system as constructed in accordance with the principles and teachings of the present invention.

With reference lastly being made to FIG. 3, additional structure, characteristic of the new and improved hot melt adhesive material dispensing system 10 of the present invention, will now be described whereby, in addition, the significance of the various structures comprising or characteristic of the dispensing nozzle block 12 and the control module 14, and the fluidic interconnections defined between the dispensing nozzle block 12 and the control module 14, as well as their fluidic interconnections to the applicator 36, will be more fully appreciated. More particularly, the discharge, dispensing, or deposition orifice of the dispensing nozzle block 12, from which the hot melt adhesive material is discharged or dispensed so as to be deposited upon a substrate, is disclosed at 54, and it has been noted that the dispensing nozzle block 12 comprises a sandwich construction comprising a laminated plate structure. The purpose of such structure is to be capable of, for example, defining a hot melt adhesive material supply path 56 within the dispensing nozzle block 12, which fluidically interconnects the first hot melt adhesive material inlet port or fluid connection 46 of the dispensing nozzle block 12 to the discharge orifice 54, as well as for defining a process air supply path 58, within the dispensing nozzle block 12, which fluidically interconnects the second process air inlet port or fluid connection 48 to the discharge orifice 54. In addition, a hot melt adhesive material recirculation flow path 60 is likewise defined internally within the dispensing nozzle block 12, and it is seen that the hot melt adhesive material recirculation flow path 60 fluidically interconnects the third hot melt adhesive material recirculation inlet port or fluid connection 50 of the dispensing nozzle block 12 to the fourth hot melt adhesive material recirculation outlet port or fluid connection 52.

Still yet further, in accordance with the additional principles and teachings of the present invention, a suitable two-position valve mechanism 62, controlled by means of a suitable actuator 64 and a control rod 66, is movably incorporated within the control module 14 so as to effectively fluidically interconnect the first hot melt adhesive material supply inlet port of fluid connection 30 of the control module 12 with the sixth hot melt adhesive material outlet port or fluid connection 42 of the control module 12, or alternatively, to effectively fluidically interconnect the first hot melt adhesive material supply inlet port of fluid connection 30 of the control module 12 with the fourth hot melt adhesive material recirculation outlet port or fluid connection 38 so as to respectively supply the hot melt adhesive material to either the hot melt adhesive material supply path 56 within the dispensing nozzle block 12, or to the hot melt adhesive material recirculation flow path 60 within the dispensing nozzle block 12. It is further noted that in accordance with additional principles and teachings of the present invention, a fixed orifice 68, having fluid flow and pressure characteristics similar to those of the discharge orifice 54 of the dispensing nozzle block 12, is incorporated within the hot melt adhesive material recirculation flow path 60 so as to effectively establish hot melt adhesive material backpressure parameters or levels, within the hot melt adhesive material recirculation flow path 60, which are effectively the same as those that exist within the hot melt adhesive material supply path 56. More particularly, the fixed orifice 68 may have predetermined structural contours so as to define a suitable nozzle structure, such as, for example, a Laval nozzle.

With reference still being made to FIG. 3, it is lastly seen that in connection with the applicator 36, the rear face 70 of the applicator 36 is provided with a first process air inlet port or fluid connection 72 for receiving process air from a process air supply source 74, and correspondingly, the front face 76 of the applicator 36 is provided with a second process air outlet port or fluid connection 78 for outputting the process air toward the second process air inlet port or fluid connection 32 of the control module 14. In a similar manner, the rear face 70 of the applicator 36 is also provided with a third hot melt adhesive material inlet port or fluid connection 80 for receiving hot melt adhesive material from a hot melt adhesive material supply reservoir 82, and correspondingly, the front face 76 of the applicator 36 is provided with a fourth hot melt adhesive material outlet port or fluid connection 84 for outputting the hot melt adhesive material toward the first hot melt adhesive material inlet port or fluid connection 30 of the control module 14. Still yet further, the front face 76 of the applicator 36 is lastly provided with a fifth hot melt adhesive material inlet port or fluid connection 86 for receiving recirculated hot melt adhesive material from the third hot melt adhesive material outlet port 34 of the control module 14, and correspondingly, the rear face 70 of the applicator 36 is provided with a sixth hot melt adhesive material outlet port or fluid connection 88 for outputting the recirculated hot melt adhesive material back toward the reservoir 82 which, as can also be appreciated from FIG. 3, is disposed within a recirculation fluid flow path 90.

It is believed that the operation of the new and improved hot melt adhesive material dispensing system 10 of the present invention is able to be readily appreciated, however, a short summary of the such operation, and the significance of the various structural components comprising the new and improved hot melt adhesive material dispensing system 10 of the present invention will now be described. More particularly, hot melt adhesive material is supplied from the reservoir 82 to the third hot melt adhesive material inlet port or fluid connection 80 of the applicator 36 by means of recirculation fluid flow path 90, and a precisely metered amount of the hot melt adhesive material is outputted from the fourth hot melt adhesive material outlet port or fluid connection 84 of the applicator 36, by means of its metering pumps, not shown, so as to effectively supply such precisely metered amount of the hot melt adhesive material to the first hot melt adhesive material inlet port of fluid connection 30 of the control module 14. Depending upon the position of the valve element 62 within the control module 14, as determined by means of the actuator 64, the hot melt adhesive material will be conducted or conveyed either to the sixth hot melt adhesive outlet port or fluid connection 42 of the control module 14 for ultimate dispensing from the discharge orifice 54 of the dispensing nozzle block 12, or alternatively, the hot melt adhesive material will be conducted or conveyed to the fourth hot melt adhesive material outlet port or fluid connection 38 of the control module 14 so as to be recirculated through the hot melt adhesive recirculation flow path 60 of the dispensing nozzle block 12.

It is to be particularly noted that as the recirculated hot melt adhesive material is being conveyed or conducted through or along the hot melt adhesive recirculation flow path 60 of the dispensing nozzle block 12, it will pass through the fixed orifice 68, which is disposed internally within the dispensing nozzle block 12, and more particularly within the hot melt adhesive recirculation flow path 60 of the dispensing nozzle block 12, such that the backpressure values, levels, or parameters, characteristic of the hot melt adhesive material flowing within the hot melt adhesive recirculation flow path 60 of the dispensing nozzle block 12, correspond to the pressure levels of the hot melt adhesive material flowing within or along the hot melt adhesive material supply path 56 of the dispensing nozzle block 12. The recirculated hot melt adhesive material is, of course, ultimately recirculated or returned to the reservoir 82, along hot melt adhesive material recirculation flow path 90, after being outputted from the fourth hot melt adhesive material outlet port or fluid connection 52 of the dispensing nozzle block 12, and after respectively traversing the fifth hot melt adhesive material inlet port or fluid connection 40 of the control module 14, the third hot melt adhesive material outlet port or fluid connection 34 of the control module 14, the fifth hot melt adhesive material inlet port or fluid connection 86 of the applicator 36, and the sixth hot melt adhesive material outlet port or fluid connection 88 of the applicator 36.

Thus, it may be seen that in accordance with the principles and teachings of the present invention, a new and improved hot melt adhesive material application or dispensing system has been disclosed wherein both the control module and the dispensing nozzle block are effectively provided with internal alternative discharge and recirculation flow paths, and a fixed orifice, having flow and pressure characteristics similar to the discharge orifice of the dispensing nozzle block, is provided within the recirculation flow path of the dispensing nozzle block. Accordingly, when the hot melt adhesive material is not being supplied to the dispensing nozzle block and its discharge orifice, the hot melt adhesive material can be recirculated through the dispensing nozzle block and the control module in accordance with controlled backpressure parameters which correspond to the supply pressure which is characteristic of the hot melt adhesive material that is alternatively supplied to the dispensing nozzle block and its discharge orifice. The fixed orifice is thus an integral component of the dispensing nozzle block, and therefore cannot be separated from the dispensing nozzle block or fluidically mismatched with respect to the discharge orifice of the dispensing nozzle block.

Obviously, many variations and modifications of the present invention are possible in light of the above teachings. For example, while the disclosure has been oriented toward the fluid control and dispensing of hot melt adhesive material, the fluid control and dispensing of other fluids is of course possible. It is therefore to be understood that within the scope of the appended claims, the present invention may be practiced otherwise than as specifically described herein.

What is claimed as new and desired to be protected by Letters Patent of the United States of America, is:

1. A dispensing nozzle for use in connection with a system for dispensing a fluid, and for recirculating the fluid when the fluid is not being dispensed, comprising:

a dispensing nozzle block;

a dispensing orifice disposed upon said dispensing nozzle block and defining predetermined supply pressure characteristics;

a fluid supply path defined within said dispensing nozzle block for supplying a fluid, to be dispensed, to said dispensing orifice;

a first fluid inlet port defined within said dispensing nozzle block and fluidically connected to said fluid supply path so as to conduct fluid from a fluid source into said fluid supply path;

a fluid recirculation path defined within said dispensing nozzle block for recirculating the fluid, to be dispensed, when the fluid, to be dispensed, is not being dispensed;

a second fluid inlet port, separate from said first fluid inlet port, defined within said dispensing nozzle block and fluidically connected said fluid recirculation path so as to conduct fluid from the fluid source into said fluid recirculation path;

a fluid outlet port defined within said dispensing nozzle block and fluidically connected to said fluid recirculation path for conducting fluid from said recirculation path back to the fluid source; and a fixed orifice disposed within said fluid recirculation path defined within said dispensing nozzle block and defining pressure characteristics similar to said predetermined supply pressure characteristics defined by said dispensing orifice such that regardless of which one of said fluid supply and fluid recirculation paths along which the fluid is being conducted, similar pressure characteristics will be present and will prevail within said dispensing nozzle block.

2. The dispensing nozzle as set forth in claim 1, wherein: said fixed orifice comprises a nozzle structure.

3. The dispensing nozzle as set forth in claim 2, wherein: said nozzle structure comprises a Laval nozzle.

4. The dispensing nozzle as set forth in claim 1, wherein: said dispensing nozzle block comprises a dispensing nozzle block for dispensing hot melt adhesive material.

5. A system for dispensing a fluid, and for circulating the fluid when the fluid is not being dispensed, comprising:

a dispensing nozzle block;

a dispensing orifice disposed upon said dispensing nozzle block and defining predetermined supply pressure characteristics;

a fluid supply path defined within said dispensing nozzle block for supplying a fluid, to be dispensed, to said dispensing orifice;

a first fluid inlet port defined within said dispensing nozzle block and fluidically connected to said fluid supply path so as to conduct fluid from a fluid source into said fluid supply path;

a fluid recirculation path defined within said dispensing nozzle block for recirculating the fluid, to be dispensed, when the fluid, to be dispensed, is not being dispensed;

a second fluid inlet port, separate from said first fluid inlet port, defined within said dispensing nozzle block and fluidically connected said fluid recirculation path so as to conduct fluid from the fluid source into said fluid recirculation path;

a fluid outlet port defined within said dispensing nozzle block and fluidically connected to said fluid recirculation path for conducting fluid from said recirculation path back to the fluid source;

a control module block operatively associated with said dispensing nozzle block for alternatively controlling the supply of the fluid to said first fluid inlet port of said fluid supply path and to said second fluid inlet port of said fluid recirculation path of said dispensing nozzle block; and a fixed orifice disposed within said fluid recirculation path defined within said dispensing nozzle block and defining pressure characteristics similar to said predetermined supply pressure characteristics defined by said dispensing orifice such that regardless of which one of said fluid supply and fluid recirculation paths along which the fluid is being conducted, similar pressure characteristics will be present and will prevail within said dispensing nozzle block.

6. The dispensing system as set forth in claim 5, wherein said control module block comprises:

a fluid inlet supply port defined within said control module block for admitting the fluid, to be dispensed, into said control module block;

first and second fluid outlet ports defined within said control module block and adapted to be respectively fluidically connected to said fluid supply and fluid recirculation paths defined within said dispensing nozzle block; and means movably disposed within said control module block for alternatively connecting said fluid inlet supply port of said control module block to one of said first and second fluid outlet ports defined within said control module block so as to alternatively permit the fluid to be fluidically conducted from said fluid inlet supply port of said control module block to one of said first and second fluid outlet ports defined within said control module block so as to, in turn, permit the fluid to be alternatively supplied to said fluid supply path and to said fluid recirculation path defined within said dispensing nozzle block.

7. The dispensing system as set forth in claim 5, wherein: said fixed orifice comprises a nozzle structure.

8. The dispensing system as set forth in claim 7, wherein: said nozzle structure comprises a Laval nozzle.

9. The dispensing system as set forth in claim 6, wherein: said means movably disposed within said control module block for alternatively connecting said fluid inlet supply port of said control module block to one of said first and second fluid outlet ports defined within said control module block comprises a two-position valve mechanism.

10. The dispensing system as set forth in claim 9, further comprising:

actuating means operatively connected to said two-position valve mechanism for moving said two-position valve mechanism between first and second positions for alternatively connecting said fluid inlet supply port of said control module block to a first one of said first and second fluid outlet ports defined within said control module block so as to permit the fluid to be fluidically conducted from said fluid inlet supply port of said control module block to said fluid supply path defined within said dispensing nozzle block, and to a second one of said first and second fluid outlet ports defined within said control module block so as to permit the fluid to be fluidically conducted from said fluid inlet supply port of said control module block to said fluid recirculation path defined within said dispensing nozzle block.

11. The dispensing system as set forth in claim 5, wherein: said dispensing system comprises a dispensing system for dispensing hot melt adhesive material.

12. A method for dispensing a fluid, and for recirculating the fluid when the fluid is not being dispensed, comprising the steps of:

providing a dispensing nozzle block having a dispensing orifice disposed upon said dispensing nozzle block for defining predetermined supply pressure characteristics;

defining a fluid supply path within said dispensing nozzle block for conducting a fluid, to be dispensed, to said dispensing orifice;

defining a first fluid inlet port within said dispensing nozzle block and fluidically connected to said fluid supply path so as to conduct fluid from a fluid source into said fluid supply path;

defining a fluid recirculation path within said dispensing nozzle block for recirculating the fluid, to be dispensed, when the fluid, to be dispensed, is not being dispensed;

defining a second fluid inlet port, separate from said first fluid inlet port, within said dispensing nozzle block and fluidically connected said fluid recirculation path so as to conduct fluid from the fluid source into said fluid recirculation path;

defining a fluid outlet port within said dispensing nozzle block and fluidically connected to said fluid recirculation path for conducting fluid from said recirculation path back to the fluid source;

operatively associating a control module block with said dispensing nozzle block for alternatively controlling the supply of the fluid to said first fluid inlet port of said fluid supply path and to said second fluid inlet port of said fluid recirculation path defined within said dispensing nozzle block; and incorporating a fixed orifice within said fluid recirculation path defined within said dispensing nozzle block so as to define pressure characteristics similar to said predetermined supply pressure characteristics defined by said dispensing orifice such that regardless of which one of said fluid supply and fluid recirculation paths along which the fluid is being conducted, similar pressure characteristics will be present and will prevail within said dispensing nozzle block.

13. The method as set forth in claim 12, further comprising the steps of:

defining a fluid inlet supply port within said control module block for admitting the fluid, to be dispensed, into said control module block;

defining first and second fluid outlet ports within said control module block so as to be configured to be respectively fluidically connected to said fluid supply and fluid recirculation paths defined within said dispensing nozzle block; and movably disposing means within said control module block for alternatively connecting said fluid inlet supply port of said control module block to one of said first and second fluid outlet ports defined within said control module block so as to alternatively permit the fluid to be fluidically conducted from said fluid inlet supply port of said control module block to one of said first and second fluid outlet ports defined within said control module block so as to permit the fluid to be alternatively supplied to said fluid supply path and to said fluid recirculation path defined within said dispensing nozzle block.

14. The method as set forth in claim 12, further comprising the step of:

providing said fixed orifice as a nozzle structure.

15. The method as set forth in claim 14, further comprising the step of:

providing said nozzle structure as a Laval nozzle.

16. The method as set forth in claim 13, further comprising the step of:

providing said means, movably disposed within said control module block for alternatively connecting said fluid inlet supply port of said control module block to one of said first and second fluid outlet ports defined within said control module block, as a two-position valve mechanism.

17. The method as set forth in claim 16, further comprising the step of:

actuating said two-position valve mechanism between first and second positions for alternatively connecting said fluid inlet supply port of said control module block to a first one of said first and second fluid outlet ports defined within said control module block so as to permit the fluid to be fluidically conducted from said fluid inlet supply port of said control module block to said fluid supply path defined within said dispensing nozzle block, and to a second one of said first and second fluid outlet ports defined within said control module block so as to permit the fluid to be fluidically conducted from said fluid inlet supply port of said control module block to said fluid recirculation path defined within said dispensing nozzle block.

18. The method as set forth in claim 12, further comprising the step of:

dispensing hot melt adhesive material from said dispensing system.

* * * * *

UNITED STATES PATENT AND TRADEMARK OFFICE

CERTIFICATE OF CORRECTION

PATENT NO. : 7,611,071 B2
APPLICATION NO. : 11/408994
DATED : November 3, 2009
INVENTOR(S) : Bolyard, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 616 days.

Signed and Sealed this

Twelfth Day of October, 2010

David J. Kappos

*Director of the United States Patent and Trademark Office*